Oct. 30, 1951  C. L. POTVIN  2,573,487
CORN AND CALLUS TRIMMER
Filed May 21, 1948

INVENTOR.
CLAUD L. POTVIN
BY Paul, Paul + Moore
ATTORNEYS

UNITED STATES PATENT OFFICE 2,573,487

CORN AND CALLUS TRIMMER

Claud L. Potvin, Minneapolis, Minn.

Application May 21, 1948, Serial No. 28,292

3 Claims. (Cl. 30—27)

This invention relates to an improved knife for cutting and trimming corns and other calloused portions of the epidermis, and whereby such trimming may be expeditiously accomplished without danger of cutting into the adjoining skin or flesh.

Numerous attempts have heretofore been made to provide a device of the character herein disclosed, whereby corns and calluses on the human body may readily be shaved or trimmed without danger of cutting the skin or flesh around the corn, but to the best of my knowledge none of these have proven entirely satisfactory.

The novel apparatus herein disclosed is the result of considerable experimental and research work in an attempt to provide a unique and practical corn and callus trimming device which is so constructed that the calloused surface of a corn, or the like, may conveniently be shaved from the corn by passing the device back and forth over the affected portion of the anatomy until the calloused portion thereof has been completely removed.

A further object is to provide a corn and callus trimming knife which may be economically manufactured in quantity production, and which comprises a handle having a head at one end provided with means for supporting a suitable knife blade therein, and the head of said device having means for gauging the depth of the cut of the blade whereby the blade cannot dig into the corn when used thereon.

A further object is to provide a corn trimming device of the class described comprising an elongated body, the major portion of which constitutes a handle whereby it may be conveniently grasped when the device is to be used, and a head being provided at one end of the handle portion having a recess therein which terminates at its bottom at a narrow elongated opening, and a knife blade being inserted through said elongated opening and having its cutting edge positioned at a pre-determined elevation below the bottom face of the head, whereby a comparatively thin shaving is removed by the blade each time the device is passed over the corn.

A further object is to provide a corn trimming device comprising a handle portion provided at one end with a head having a recess therein for receiving a knife blade, the knife blade being removably supported in the head whereby it may readily be detached therefrom for sharpening, when necessary, and the head being formed of a transparent material whereby the corn may readily be noted therethrough and whereby the operator may readily observe the action of the knife as it passes over the corn.

Other objects of the invention reside in the provision of a corn trimming device, the body of which may readily be constructed of a suitable transparent composition synthetic material such as "Lucite," whereby the operation of the knife on a corn may readily be noted through the head of the device; in the provision of such a device comprising a head having means therein for supporting a knife blade with the cutting edge of the blade disposed at a fixed distance from the bottom of the head, to thereby gauge the thickness of the shaving removed from the corn, each time the device is passed thereover; in the provision of a corn trimming device having a transparent head provided with means for detachably supporting a knife blade, and a longitudinal guide rib being provided on the bottom of the head to facilitate guiding it over the corn or calloused portion of the body being treated.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figure 1:
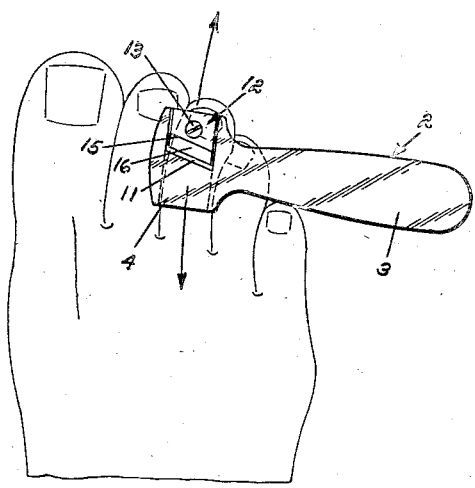
Figure 1 is a view showing the device as used to trim a corn.

The novel corn and callus trimming knife herein disclosed is shown comprising an elongated body, generally designated by the numeral 2, one end of which provides a handle 3 and the other end a head 4. The handle portion 2 is shaped to provide a convenient grip for the operator's hand, whereby the device may readily be lightly moved back and forth over a corn or other part of the body, as indicated by the arrows in Figure 1.

The body 2 may readily be formed from a suitable material such as "Lucite," which is readily moldable and has the inherent characteristic of being highly transparent, whereby the corn being operated upon may readily be noted through the head 4, as the device is passed back and forth over the corn in the operation of trimming the corn.

A recess 5 is provided in the head 4 and is defined by a front wall 6, rear inclined wall 7, and spaced side walls 8. The lower edge portion 9 of the inclined wall 7 is spaced rearwardly from the lower edge of the front wall 6 to provide an elongated opening or gap 11 which preferably is disposed at an incline to the longitudinal axis of the head 4, as clearly illustrated in Figure 1.

Figure 3:
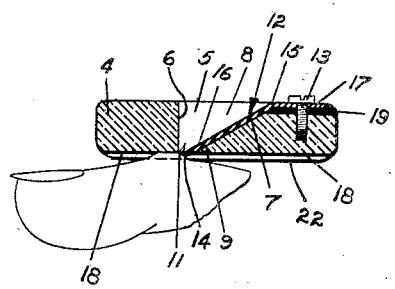
Figure 3 is an enlarged detail sectional view on the line 3—3 of Figure 4; showing the position of the cutting edge of the knife with respect to the bottom surface of the head.

A knife blade, generally designated by the numeral 12, is adapted to be secured in position in the head 4 by a suitable screw 13, received in threaded engagement with the head, as illustrated in Figure 3. The cutting edge 14 of the knife blade 12 is disposed at an incline corresponding to the inclination of the opening 11 in the bottom of the head, thereby to cause the knife-blade to engage the corn with a shearing cut, as will be understood by reference to Figure 1. The body of the knife blade is bent, as shown at 15 in Figures 2 and 3, whereby the forward portion 16 of the blade may seat upon the wall 7 of the recess 5, when the rear portion 17 of the knife blade is seated upon the rear upper portion of the head, as best illustrated in Figure 3.

Figure 2:
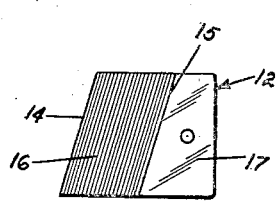
Figure 2 is a view of the knife blade detached from its supporting head.

The knife blade is so proportioned with respect to the thickness of the head 4 that when the knife blade is secured in the head, as shown in Figures 1 and 3, the cutting edge 14 of the knife blade will be positioned a fraction of an inch below the bottom surface 18 of the head 4 of the device, thereby to control and regulate the depth of cut of the knife edge when engaging the top surface of the corn or callus being treated.

In operation, the head 4 of the tool is passed back and forth over the corn, as indicated by the arrows in Figure 1, with the bottom surface 18 of the head 4 constantly engaging the corn, whereby the depth of each cut of the knife blade will be equal to the projection of the knife blade through the opening 11 in the bottom of the head 4.

Figure 4:
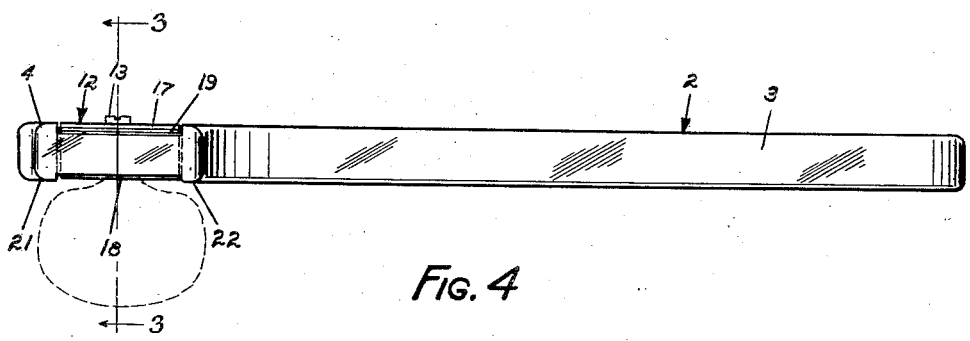
Figure 4 is a side view of the device.

A plurality of shims 19 may be interposed between the upper horizontal portion 17 of the knife blade and the head 4, whereby the cutting edge 14 of the knife may be adjusted with relation to the bottom surface 18 of the head 4 to vary the depth of cut, as clearly illustrated in Figures 3 and 4. Longitudinally extending ribs 21 and 22 are provided at the sides of the bottom surface 18 of the head and cooperate to guide the tool in its fore and aft movement over the corn, thereby to make certain that the knife edge will engage only the corn when passed back and forth, as indicated by the arrows in Figure 1.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a device for trimming corns, calluses and the like comprising an elongated body provided at one end with an enlarged transparent head, a recess in said head terminating at its bottom in an elongated opening disposed obliquely to the longitudinal axis of the head, an angularly shaped knife blade having one end adapted to be seated on top of the head and having its other end extending downwardly through the recesses and projecting through said elongated opening, the projecting end portion of said knife being sharpened and having its cutting edge disposed obliquely to the longitudinal axis of the head and directed away from the handle, and so spaced from the bottom surface of said head that when the device is passed over a corn, the cutting edge of the knife will sever a shaving from the top of the corn, the thickness of which is determined by the downward spacing of the cutting edge of the knife from the bottom surface of the head, and guide means integral with the bottom of the head to facilitate guiding the device over a corn in the operation of dressing the top thereof, the transparency of said head permitting the operator to readily note the corn as it is being trimmed by the knife.

2. In a device for trimming corns, calluses and the like comprising an elongated body provided at one end with an enlarged head, said head having a recess terminating at its bottom in an elongated opening disposed obliquely to the longitudinal axis of the head, said recess having an inclined blade supporting wall, said head having a horizontally disposed portion extending transversely of said inclined wall and from the edge of said recess adjacent said inclined wall portion thereof, a knife blade having a cutting edge on one end disposed at an incline to the longitudinal axis of the blade and a face portion at the other end thereof spaced from said cutting edge, said knife blade being supported in said recess upon said inclined wall portion thereof and extending downwardly through said recess to project through said elongated opening, said face portion of said knife blade being engaged with said transversely extending horizontally disposed portion of said head, and means engaging said knife blade and said head for clamping said knife blade upon said inclined supporting wall and said face portion of said knife blade in engagement with said transversely extending horizontally disposed portion of said head, whereby the cutting edge of said knife blade is spaced from said head sufficiently to engage a corn and remove shavings therefrom when the device is moved back and forth with its bottom surface engaging the corn.

3. In a device for trimming corns, calluses and the like comprising an elongated body provided at one end with an enlarged head, said head having a recess terminating at its bottom in an elongated opening disposed obliquely to the longitudinal axis of the head, said recess having an inclined blade supporting wall, said head having a horizontally disposed portion extending transversely of said inclined wall and from the edge of said recess adjacent said inclined wall portion thereof, a knife blade having a cutting edge on one end disposed at an incline to the longitudinal axis of the blade and a face portion at the other end thereof spaced from said cutting edge, said knife blade being supported in said recess upon said inclined wall portion thereof and extending downwardly through said recess to project through said elongated opening, said face portion of said knife blade being engaged with said transversely extending horizontally disposed portion of said head, means engaging said knife blade and said head for clamping said knife blade upon said inclined supporting wall and said face portion of said knife blade in engagement with said transversely extending horizontally disposed portion of said head, and guide means on the bottom of the head to facilitate guiding the device over a corn in the operation of dressing the top thereof, whereby the head and cutting edge of the knife blade of said device are aligned with a corn when the device is moved back and forth with its bottom surface engaging the corn.

CLAUD L. POTVIN.

REFERENCES CITED

The following references are of record in the file of this patent:

UNITED STATES PATENTS

| Number | Name | Date |
|---|---|---|
| 727,396 | Luhrman | May 5, 1903 |
| 861,836 | Havell | July 30, 1907 |
| 1,498,156 | Drew | June 17, 1924 |
| 1,698,045 | Behrman | Jan. 8, 1929 |
| 1,753,086 | Niedomanski | Apr. 1, 1930 |
| 2,319,607 | Kevorkian et al. | May 18, 1943 |
| 2,442,694 | Keisser | June 1, 1948 |
| 2,455,972 | Bowditch | Dec. 14, 1948 |
| 2,507,402 | DuPont | May 9, 1950 |

FOREIGN PATENTS

| Number | Country | Date |
|---|---|---|
| 519,755 | Germany | Mar. 4, 1931 |